US012774983B2

(12) United States Patent
Lesso et al.

(10) Patent No.: US 12,774,983 B2
(45) Date of Patent: Oct. 27, 2026

(54) CIRCUITRY FOR MEASUREMENT OF ELECTROCHEMICAL CELLS

(71) Applicant: Cirrus Logic International Semiconductor Ltd., Edinburgh (GB)

(72) Inventors: John P. Lesso, Edinburgh (GB); James T. Deas, Edinburgh (GB); Claire Motion, Edinburgh (GB)

(73) Assignee: Cirrus Logic Inc., Austin, TX (US)

( * ) Notice: Subject to any disclaimer, the term of this patent is extended or adjusted under 35 U.S.C. 154(b) by 89 days.

(21) Appl. No.: 18/802,261

(22) Filed: Aug. 13, 2024

(65) Prior Publication Data

US 2025/0244285 A1 Jul. 31, 2025

Related U.S. Application Data

(60) Provisional application No. 63/633,916, filed on Apr. 15, 2024, provisional application No. 63/626,129, filed on Jan. 29, 2024.

(51) Int. Cl.
*G01N 27/416* (2006.01)
*G01N 27/333* (2006.01)

(52) U.S. Cl.
CPC ......... *G01N 27/416* (2013.01); *G01N 27/333* (2013.01)

(58) Field of Classification Search
CPC .......................... G01N 27/416; G01N 27/333
USPC .......................................................... 324/425
See application file for complete search history.

(56) References Cited

U.S. PATENT DOCUMENTS

| | | | | |
|---|---|---|---|---|
| 7,901,555 | B2 * | 3/2011 | Jiang | G01N 27/308 204/418 |
| 9,568,450 | B2 * | 2/2017 | Hanko | G01N 27/4167 |
| 10,883,957 | B2 * | 1/2021 | Zhang | G01N 27/333 |
| 2010/0066378 | A1 | 3/2010 | Ahmadi et al. | |
| 2011/0270062 | A1 * | 11/2011 | Goode, Jr. | A61B 5/14539 600/347 |
| 2012/0298530 | A1 | 11/2012 | Yunus et al. | |
| 2020/0166477 | A1 * | 5/2020 | Löbbert | G01N 27/40 |
| 2021/0199615 | A1 | 7/2021 | Elder et al. | |
| 2023/0073825 | A1 * | 3/2023 | Doran | G01N 27/286 |
| 2023/0236146 | A1 * | 7/2023 | Mizuno | G01N 27/4067 204/424 |
| 2023/0408596 | A1 | 12/2023 | Lesso et al. | |

FOREIGN PATENT DOCUMENTS

| | | |
|---|---|---|
| EP | 2093562 B1 | 8/2017 |
| WO | 2016059472 A2 | 4/2016 |

OTHER PUBLICATIONS

International Search Report and Written Opinion of the International Searching Authority, International Application No. PCT/GB2024/052846, mailed Feb. 4, 2025.

* cited by examiner

*Primary Examiner* — Christopher P McAndrew
(74) *Attorney, Agent, or Firm* — Jackson Walker L.L.P.

(57) ABSTRACT

Circuitry for processing a sense signal obtained from an electrochemical cell having a first electrode and a second electrode, the circuitry comprising: drive circuitry configured to apply a first voltage at a first electrode; measurement circuitry configured to measure the sense current at the second electrode and output a sense signal based on the measured sense current; control circuitry configured to: generate an output signal based on the sense signal; and adapt the first voltage based on the output signal.

30 Claims, 7 Drawing Sheets

CIRCUITRY FOR MEASUREMENT OF ELECTROCHEMICAL CELLS

The present disclosure claims priority to U.S. Provisional Patent Application Ser. No. 63/633,916, filed Apr. 15, 2024, and U.S. Provisional Patent Application Ser. No. 63/626,129, filed Jan. 29, 2024, each of which is incorporated by reference herein in its entirety.

TECHNICAL FIELD

The present disclosure relates to circuitry for measuring characteristics in electrochemical cells.

BACKGROUND

Electrochemical sensors are widely used for the detection or characterisation of one or more particular chemical species, analytes, typically as an oxidation or reduction current. Such sensors comprise an electrochemical cell, consisting of two or more electrodes configured for contact with an analyte whose concentration is to be ascertained.

For potentiostatic measurement typically used for characterisation of potentiostatic cells, sensors may comprise circuitry for driving one or more of the electrodes and circuitry for measuring a response signal at one or more of the electrodes. The measured response signal can be processed to determine a concentration of an analyte.

For potentiometric measurement typically used for characterisation of ion-selective electrode (ISE) sensors, a potential difference is measured between an electrode and an analyte with no external bias and with no current flow. A working electrode (indicator electrode) of the electrochemical cell can be used as a proxy for the electrode, and a reference electrode can be used as a proxy for the analyte. Thus, the potential difference between the working electrode and the reference electrode gives an indication of a property of the electrode and the analyte.

An electrode such as an ISE can decay or degrade with significant impedance changes due to reactions between the environment (such as a human body) to the presence of the electrode. This decay can negatively impact any coating provided on the electrode. To ensure little or no current flows from the electrochemical cell, it is conventional to use measurement circuitry with a high input impedance. Synthesizing such high input impedance often requires either active circuitry or complex process options which can lead to added cost and complexity.

SUMMARY

According to a first aspect of the disclosure, there is provided circuitry for processing a sense signal obtained from an electrochemical cell having a first electrode and a second electrode, the circuitry comprising: drive circuitry configured to apply a first voltage at a first electrode; measurement circuitry configured to measure the sense current at the second electrode and output a sense signal based on the measured sense current; control circuitry configured to: generate an output signal based on the sense signal; and adapt the first voltage based on the output signal.

The sense signal may comprise a sense voltage or a sense current.

The control circuitry may be configured in a DC-sensing mode to control the first voltage to maintain the sense current at or near a predetermined current level, such as zero amps.

The control circuitry may be configured in an AC-sensing mode to control the drive circuitry to adapt the first voltage to have a time-varying component.

The control circuitry may be configured to control the first voltage to have a swept component. The swept component may comprise amplitude and/or frequency.

The control circuitry may be configured to control the first voltage to comprise a sine wave, a step function, or a chirp.

The control circuitry may be configured to determine a second voltage at which the sense signal is substantially zero; and determine a characteristic of the electrochemical cell based on the second voltage.

The control circuitry may be configured to determine a third voltage at which the sense signal is most discriminative.

The control circuitry may be configured to switch between a DC-sensing mode and an AC sensing mode. In the DC-sensing mode, the control circuitry may be configured to control the first voltage to maintain the sense current at or near a predetermined current level. In an AC-sensing mode, the control circuitry may be configured to control the first circuitry to adapt the first electrode voltage to have a time varying component.

The DC-sensing mode may be a lower power mode than the AC sensing mode.

The control circuitry may be configured to switch between the DC-sensing mode and AC sensing mode in response to an interrupt.

The control circuitry may be configured to switch between the DC-sensing mode and AC sensing mode in response to determining that an analyte concentration in the cell is outside of a predetermined range.

The control circuitry may be configured to combine measurements obtained in the DC-sensing mode and the AC-sensing mode.

A frequency of the first voltage may be selected based on a characteristic of an analyte to be monitored.

The measurement circuitry may comprise a transimpedance amplifier, TIA, comprising: an op-amp having a first input coupled to the second electrode, a second input coupled to a reference voltage node, a TIA output to output the sense signal; and a feedback impedance coupled between the TIA output and the first input. The first input may comprise an inverting input and the second input may comprise a non-inverting input.

The reference voltage node may be coupled to a reference voltage. The reference voltage may be set to half a supply voltage of the TIA.

The measurement circuitry may comprise a current conveyor, CC, comprising: a first input coupled to the second electrode, a second input coupled to a reference voltage node, and a current conveyor output to output the sense signal.

The control circuitry may comprise a loop filter configured to filter the sense signal to generate the output signal, the output signal provided as an input to the drive circuitry.

The control circuitry may comprise: an analog-to-digital converter, ADC, configured to convert the sense signal to a digital sense signal; a digital loop filter configured to filter the digital sense signal to obtain the output signal; and an digital-to-analog converter, DAC, configured to convert the output signal to a control signal for controlling the drive circuitry.

The control circuitry may comprise: a quantiser configured to sample the output signal at a sampling frequency to generate a sampled output signal; and a DAC configured to convert the sampled output signal to a control signal for controlling the drive circuitry.

The measurement circuitry may be configured to output the sense signal based on the output signal.

The measurement circuitry may comprise a gain stage. The output signal may be provided as an input to the gain stage, the gain stage configured to output the drive voltage.

The second electrode may be an ion-selective electrode.

The circuitry may further comprise processing circuitry configured to: determine an impedance of the electrochemical cell based on the output signal.

The circuitry may further comprise processing circuitry configured to: determine a concentration of an analyte in the electrochemical cell based on the output signal.

The circuitry may be operable in a potentiostatic mode and a potentiometric mode. In the potentiostatic mode, the circuitry may be operable in an open loop configuration in which the adaptation of the first voltage based on the output signal is disabled. In the potentiometric mode, the circuitry may be operable in a closed loop configuration in which the adaptation of the first voltage based on the output signal is enabled.

The control circuitry may be implemented on a microcontroller or a field programmable gate array, FPGA.

According to another aspect of the disclosure, there is provided circuitry for use in a system for processing a signal obtained from an electrochemical cell having a first electrode and a second electrode, the control circuitry configured to: receive a sense signal from measurement circuitry configured to measure a sense current at the second electrode and output the sense signal based on the measured sense current; generate an output signal based on the sense signal; and control drive circuitry to apply a first voltage at the first electrode, wherein the control circuitry is configured to adapt the input voltage based on the output signal.

According to another aspect of the disclosure, there is provided circuitry for characterising an electrochemical cell having a first electrode and a second electrode, the circuitry configured to operate in: an open loop mode for potentiometric measurement of the electrochemical cell, the open loop mode comprising measuring a sense voltage across the cell; and a closed loop mode for potentiostatic measurement of the electrochemical cell, the closed loop mode comprising applying a first voltage to the first electrode and measuring a response of the electrochemical cell at the second electrode, the first voltage dependent on the measured response.

According to another aspect of the disclosure, there is provided a system, comprising: a first integrated circuit, IC, comprising the drive circuitry and the measurement circuitry as described above; and a second IC comprising the control circuitry as described above.

According to another aspect of the disclosure, there is provided an electrochemical sensor, comprising: the circuitry described above; and the electrochemical cell.

According to another aspect of the disclosure, there is provided a multi-analyte sensor, comprising: the circuitry described above; and the electrochemical cell, wherein the first electrode is a reference electrode, the second electrode is a first ion selective electrode, and wherein the electrochemical cell further comprises a second ion selective electrode.

According to another aspect of the disclosure, there is provided an electronic device, comprising circuitry, a system, or a sensor as described above.

The electronic device may comprise one of an analyte monitoring device or an analyte sensing device, a battery, a battery monitoring device, a mobile computing device, a laptop computer, a tablet computer, a games console, a remote control device, a home automation controller or a domestic appliance, a toy, a robot, an audio player, a video player, or a mobile telephone, and a smartphone.

According to another aspect of the disclosure, there is provided a method of controlling a system comprising drive circuitry and measurement circuitry, the system for processing a signal obtained from an electrochemical cell having a first electrode and a second electrode, the method comprising: receiving a sense signal from the measurement circuitry configured to measure a sense current at the second electrode and output the sense signal based on the measured sense current; generating an output signal based on the sense signal; and controlling the drive circuitry to apply a first voltage at the first electrode; and adapting the input voltage based on the output signal.

According to another aspect of the disclosure, there is provided a sensor system for analyte monitoring an electrochemical cell having an ion selective electrode, the sensor system comprising: a potentiostat circuit to be coupled with a first ion selective electrode (or ISE) of the electrochemical cell, to monitor a voltage level at the ion selective electrode; a driver or amplifier to be coupled with a reference electrode of the electrochemical cell, to apply a reference voltage to a second electrode of the electrochemical cell; and a controller arranged to control the operation of the driver or amplifier, to adjust the applied reference voltage based at least in part on the monitored voltage level at the ion selective electrode.

The potentiostat circuit may generate an output voltage which is proportional to the input current from the first electrode.

The potentiostat circuit may output a current indicative of the voltage level across the electrochemical cell. The controller may adjust the reference voltage applied by the driver or amplifier to maintain the output current of the potentiostat at or near zero.

The controller may adjust the reference voltage applied by the driver or amplifier to maintain the output current of the potentiostat at a reference current level.

The controller may comprise a loop filter arranged to receive an output of the potentiostat circuit to generate an output signal representative of a voltage level at the ion selective electrode.

The loop filter may generate a control signal to adjust operation of the driver or amplifier. The output signal from the loop filter may be used as the control signal.

The controller may comprise a sigma-delta converter. The output of the loop filter is sampled using a quantizer Q clocked at a sampling frequency Fs to generate the output signal.

The potentiostat circuit may comprise a transimpedance amplifier. Alternatively, the potentiostat circuit comprises a current conveyor.

The sensor system may be operable in a diagnostic mode, wherein the controller adjusts the applied reference voltage to stimulate the electrochemical cell. The controller may be operable to determine a characteristic or state of the electrochemical cell based on the voltage level monitored by the potentiostat circuit.

The controller may adjust the driver or amplifier to apply a linearly time-varying voltage to the second electrode of the electrochemical cell, such that the output of the sensor system can be used in a cyclic voltammetry operation.

The sensor system may be configured to determine a potentiometric operating condition based on the output of the cyclic voltammetry operation, based on when the sensed current at the input to the potentiostat circuit is at or near zero for a linearly time varying voltage applied to the second electrode.

For an electrochemical cell having a third electrode, the potentiostat circuit may be arranged to be coupled with the third electrode as a second input to the potentiostat circuit.

The sensor system may be provided as a single integrated circuit (or IC) for coupling with an electrochemical cell having an ion selective electrode.

The sensor system may be provided as a first IC comprising the potentiostat circuit (and optionally the driver or amplifier) and a second IC comprising the controller and/or loop filter. In such an implementation, the first and/or second ICs may comprise an ADC and/or a DAC for the conversion of signals between the analog and digital domains, as described above.

The controller may be configured to generate a stimulus signal to be applied by the amplifier or driver to the electrochemical cell.

The stimulus signal may comprise a time-varying signal such as a sine wave, a step function, or a chirp signal.

The stimulus signal may be generated by the controller in response to one or more of the following factors: when the monitored voltage level meets or exceeds a threshold level; when the monitored voltage level deviates by more than a certain amount in a certain time period; and/or when a defined time period has elapsed since a stimulus signal was last applied.

The stimulus signal may be continuously applied, with a continuous measurement performed.

The frequency of the stimulus signal may be selected based on the characteristics of the analyte to be monitored.

The system may be configured to perform both a static-current based (or DC) measurement operation and a variable-current-based (or AC) measurement operation.

The system may be arranged to combine or fuse the measurement outputs from both the static-current-based and the variable-current-based measurement operations.

According to a further aspect of the disclosure, there is provided a controller for use in a sensor system for the monitoring of an analyte using an electrochemical cell, the controller arranged to: receive an input from a potentiostat circuit, preferably a current signal, the input from the potentiostat circuit indicative of a voltage at an electrode coupled with the potentiostat circuit; generate an output signal based on the received input; and generate a control signal to adjust operation of a driver coupled with the controller, the driver for applying a voltage to an electrode of the electrochemical cell, wherein the control signal is based on the input received from the potentiostat circuit.

According to another aspect of the disclosure, there is provided a control method for a sensor system for the monitoring of an analyte using an electrochemical cell, the method comprising the steps of: receiving an input from a potentiostat circuit, preferably a current signal, the input from the potentiostat circuit indicative of a voltage at an electrode coupled with the potentiostat circuit; generating an output signal based on the received input; and generating a control signal to adjust operation of a driver coupled with the controller, the driver for applying a voltage to an electrode of the electrochemical cell, wherein the control signal is based on the input received from the potentiostat circuit.

Throughout this specification the word "comprises", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the present disclosure will now be described by way of non-limiting examples with reference to the drawings, in which.

DESCRIPTION OF EMBODIMENTS

Embodiments of the present disclosure relate to the measurement of signals (such as analyte signals) in electrochemical cells. In particular, embodiments relate to improved methods and circuitry for the characterisation of electrochemical cells using potentiostatic measurements. Embodiments of the present disclosure use potentiostatic techniques to perform measurements on electrochemical cells which are conventionally measured using potentiometric techniques. Such electrochemical cells include those that comprise an ion-selective electrode (ISE).

Figure 1:
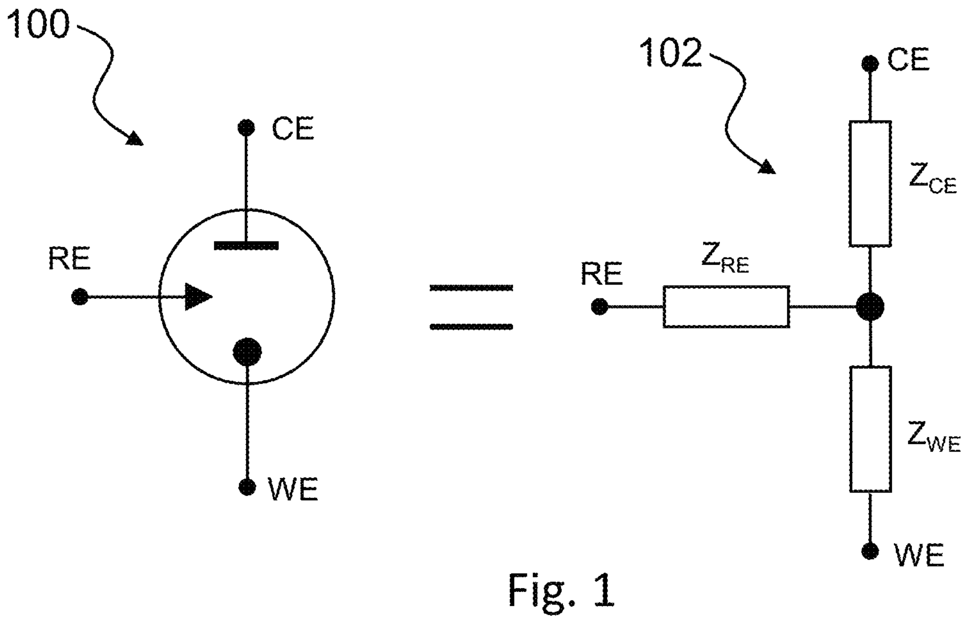
FIG. 1 illustrates a schematic diagram and electrical equivalent circuit for a three-electrode electrochemical cell.

FIG. 1 is a schematic diagram of an example electrochemical cell 100 comprising three electrodes, namely a counter electrode CE, a working electrode WE and a reference electrode RE. FIG. 1 also shows an equivalent circuit 102 for the electrochemical cell 100 comprising a counter electrode impedance ZCE, a working electrode impedance ZWE and a reference electrode impedance ZRE.

Figure 2:
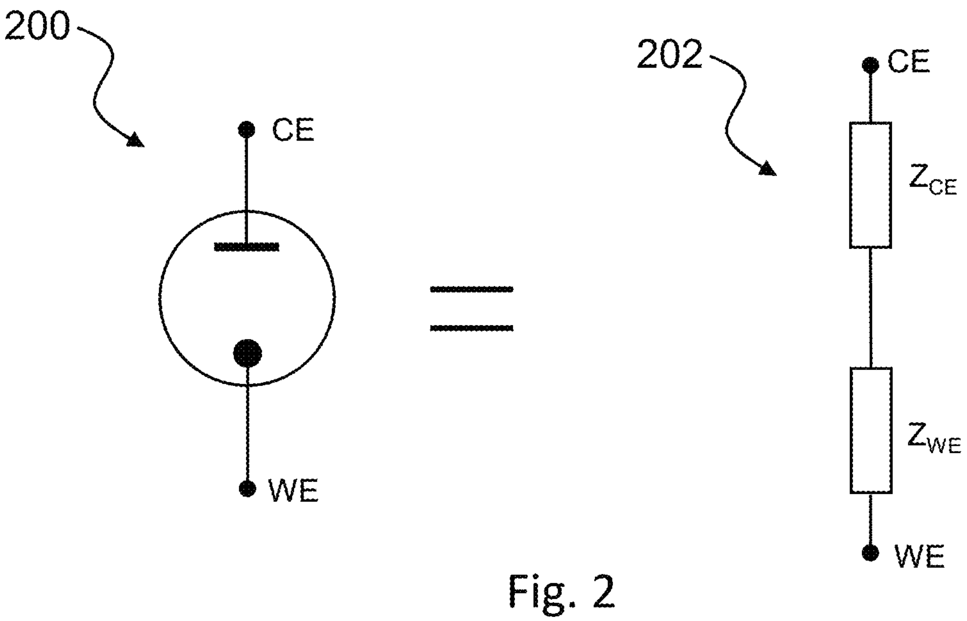
FIG. 2 illustrates a schematic diagram and electrical equivalent circuit for a two-electrode electrochemical cell.

FIG. 2 is a schematic diagram of another example electrochemical cell 200 comprising two electrodes, namely a counter electrode CE and a working electrode WE. The electrochemical cell 200 varies for the cell 100 with the omission of the reference electrode RE. FIG. 2 also shows an equivalent circuit 102 for the electrochemical cell 200 comprising a counter electrode impedance ZCE and a working electrode impedance ZWE.

In some embodiments, the working electrode WE comprise an assay or chemical of interest. For example, for the analysis of glucose as an analyte, the working electrode may comprise a layer of glucose oxidase. The counter electrode CE is provided to form an electrical or ohmic connection with the working electrode WE. Optionally, the reference electrode is provided, which is typically a sensing point between the working electrode WE and the counter electrode CE, allowing independent measurement of the potential associated with each of the working and counter electrodes WE. CE, rather than just measuring a potential difference between the counter and working electrodes CE, WE.

The cells 100, 200 may be implemented for potentiostatic measurement.

In potentiostatic arrangements, to determine a characteristic of either of the electrochemical cells 100, 200, and therefore an analyte concentration, it is conventional to apply a bias voltage at the counter electrode CE and measure a current at the working electrode WE. When provided, the reference electrode RE may be used to measure a voltage drop between the working electrode WE and the reference electrode RE. The bias voltage is then adjusted to maintain the voltage drop between the reference and working electrodes RE, WE constant. As the resistance in the cell 100 increases, the current measured at the working electrode WE decreases. Likewise, as the resistance in the cell 100 decreases, the current measured at the working electrode WE increases. Thus the electrochemical cell 100 reaches a state of equilibrium where the voltage drop between the reference electrode RE and the working electrode WE is maintained constant. Since the bias voltage at the counter electrode CE and the measured current at WE are known, the resistance of the cell 100 can be ascertained.

The cells 100, 200 shown in FIGS. 1 and 2 are primarily configured for potentiostatic sensing in which a response of the cells to a stimulus is measured. An alternative type of sensing is potentiometric sensing, in which a potential across a cell is measured without applying any bias or stimulus to the cell 100.

Figure 3:
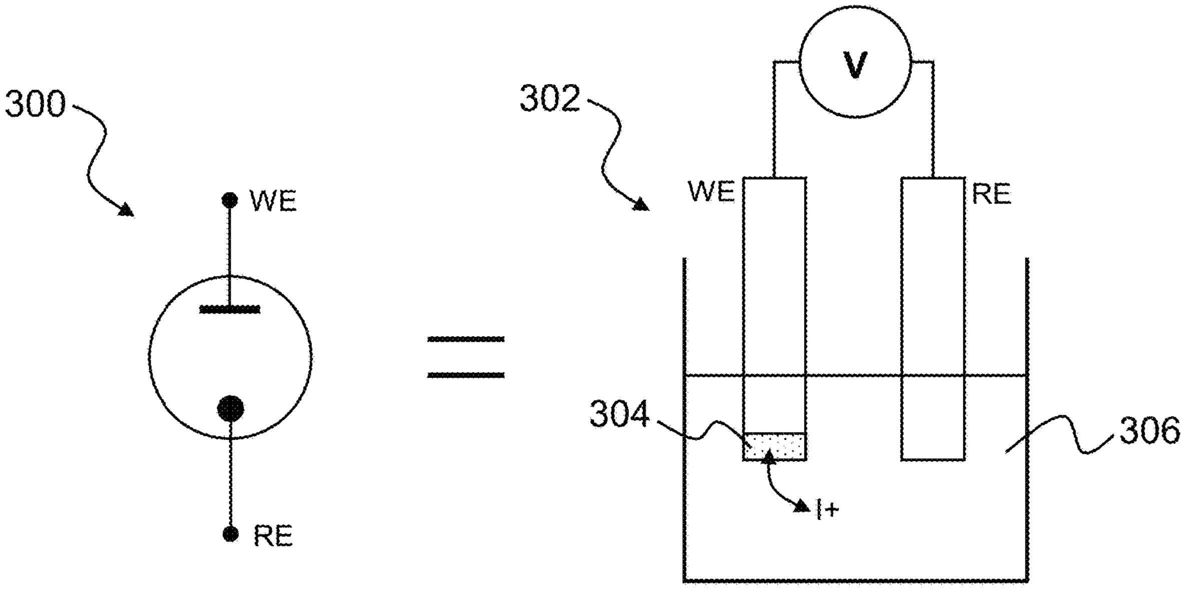
FIG. 3 illustrates a schematic diagram of a potentiometric sensor.

FIG. 3 illustrates an electrochemical cell 300 typically configured for potentiometric sensing alongside a schematic diagram of an example implementation of the electrochemical cell 300 as a potentiometric sensor. The cell 300 comprises a working electrode WE and a reference electrode RE. The working electrode WE comprises an ion-selective membrane 304, which may be configured to uptake only a specific ion (in this case the cation, I+) from an electrolyte solution 306. As such, the potential difference between the working electrode WE and the reference electrode RE depends on the concentration of that particular ion analyte in the electrolyte solution 306.

To accurately measure the potential difference across the cell 300, as little as possible current (ideally no current) need flow into the cell 300. Hence, a typical approach to voltage measurement is to couple each of the working and reference electrodes WE, RE to high input impedance buffers which are used, in turn, to drive one or more ADCs (e.g. two single ended ADCs or one differential ADC). A digital output signal is then derived which represents the potential difference between working and reference electrode WE, RE of the cell 300.

Figure 4:
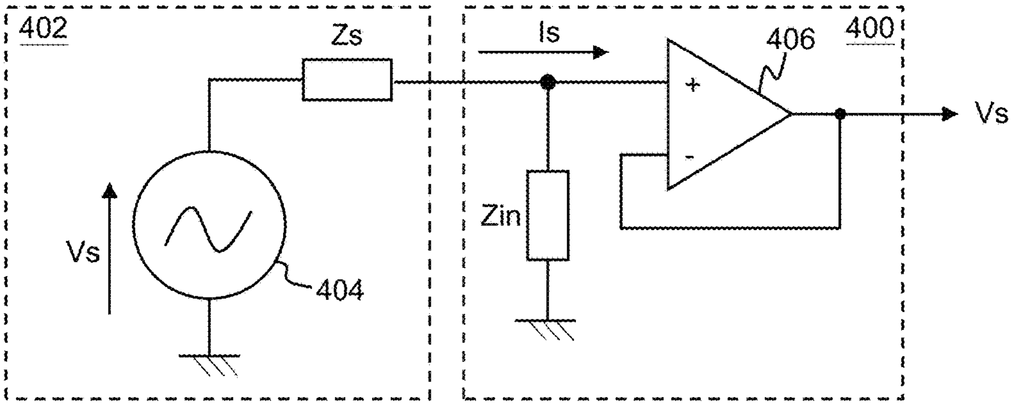
FIG. 4 is a schematic diagram of a known high input impedance measurement circuit.

FIG. 4 is a schematic diagram of a typical measurement circuit 400 for measuring a potential difference Vs across the two-electrode cell 300 implemented as a potentiometric sensor. An equivalent circuit model 402 for the cell 300 is shown in FIG. 4. The model comprises a voltage source 404 (generating the potential difference or sense voltage Vs) and a series impedance Zs coupled. The voltage source 404 is coupled between a reference voltage (in this case ground) and the series impedance Zs which itself is coupled to an input of the measurement circuit 400. The measurement circuit 400 comprises a buffer amplifier 406 and an input impedance Zin. A non-inverting input of the buffer amplifier 406 is coupled to the series impedance Zs of the cell 200. The input impedance Zin is coupled between the non-inverting input of the buffer amplifier 406 and a reference voltage (in this case ground). An inverting input and output of the buffer amplifier 406 are coupled together. Thus, the measurement circuit 400 is configured as a high input impedance buffer amplifier which buffers the sense voltage Vs across the cell 200 to the output of the measurement circuit 400.

The input impedance Zin of the measurement circuit 400 is typically an order of magnitude higher than the series impedance Zs of the cell 200. With electrochemical sensors typically having an impedance in the gigaohm range (e.g. 1-10 GΩ), this can lead to the measurement circuit 400 having an input impedance Zs in the order of teraohms (e.g. 1-10 TΩ). To operate at such high input impedance, the measurement circuit 400 is required to have low leakage to avoid drift in the sensed voltage Vs. Such operation can lead to high power consumption and large circuit area. In attempting to select an appropriate impedance level, the impedance needs to be high enough to receive a useful signal, but not so high that leakage and/or noise saturates the circuit front-end. Additionally, synthesizing the required input impedance Zin can require either active circuitry or complex process options which can lead to added cost and complexity. Despite such efforts, the circuit 400 tends to show undesirable temperature dependence.

Thus, there are several problems with the use of high input impedance measurement circuitry of potentiometric sensing:

1. Noise/Drift: A variety of noise sources exist, including drift, which lead to errors in measured DC voltage and hence inferred concentration levels. For example, low frequency noise (e.g. drift) which is due to 1/fn noise in the measurement circuitry and in the sensor/cell 300. Additionally, leakage currents can give rise to noise due to the high input impedance. Small leakage currents give rise to large voltages relative to the signal level. Sensitivity to leakage is a large problem for wearable sensors, as high moisture environments (e.g. when in a bath or shower) are a common use case. The high impedance of the sensor also causes coupling issues and common mode settling problems.
2. Calibration: It is desirable to convert measured voltage into a concentration of an analyte present in the cell 300. However, the measured output voltage Vs is a sum of the voltage difference between the Reference Electrode (RE) and the Working Electrode (WE), both of which can evolve differently in time.
3. Selectivity: Selectivity describes how much of the sense voltage Vs is due to the ion of interest versus an interfering ion. For example, sodium (Na) and potassium (K) ions are relatively similar which can present selectivity challenges. Improved selectivity to just the ion of interest is desirable. Due to different diffusion time constants for each ion, the impedance of the cell 300 will respond differently at different frequencies.

Embodiments of the present disclosure aim to address or at least ameliorate one or more of the above issues by avoiding the need for high input impedances in potentiometric sensing. Specifically, it is proposed to use a potentiostatic circuit in a feedback loop to control the voltage across an ISE to allow for sensing of a system comprising the ISE. Embodiments of the present disclosure may additionally provide circuitry for periodically or continuously performing a sensor health check to monitor for impedance changes in a system comprising an electrochemical cell. A system current can be tracked so that the system can compensate for sensor decay and/or determine if electrodes of a sensor or cell have degraded to an unacceptable level. This in turn can prompt a fault or replacement notification to a user or third party.

Figure 5:
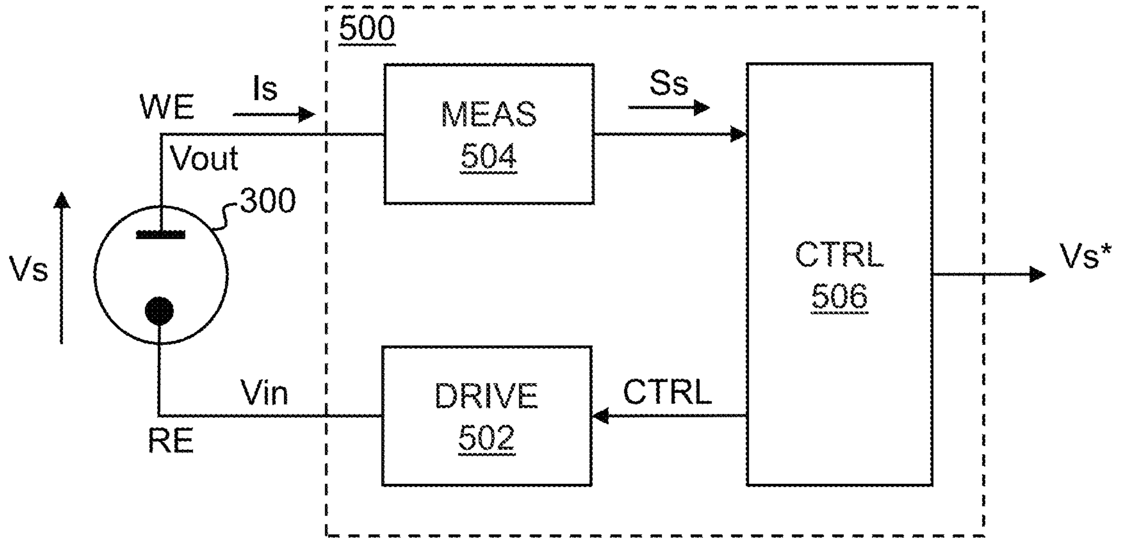
FIGS. 5 to 7 are schematic diagrams of drive and measurement circuits.

FIG. 5 is a schematic diagram of drive and measurement circuitry 500 according to embodiments of the present disclosure for characterising the electrochemical cell 300, comprising drive circuitry 502, measurement circuitry 504, and control circuitry 506.

The drive circuitry 502 is configured to apply a voltage Vin to the reference electrode RE of the cell 300. An output voltage Vout measured at the working electrode WE of the cell 300 is provided to the measurement circuitry 504 which is configured to output a sense signal Ss proportional to a sense current Is flowing from the working electrode WE. The sense signal Ss is provided as an input to the control circuitry 506, which is configured to generate an output signal Vs* (in this example a voltage) which is representative of a sense voltage Vs across the cell 300. As such, the output signal Vs* may be used to determine an impedance of the cell 300 and/or a condition at the cell 300. Such conditions may comprise one or more of an analyte concentration, a state of health of the cell, and a fault in the cell 300. The output signal Vs* may be a current or a digital signal in other embodiments. The control circuitry 506 is further configured to output a control signal CTRL to the drive circuitry 502 to control operation of the drive circuitry 502 based on the sense current Is. For example, the control circuitry 506 may control the input voltage Vin in dependence on the sense signal Ss. The control circuitry 506 may comprise a loop filter, as will be described in more detail below.

Figure 6:
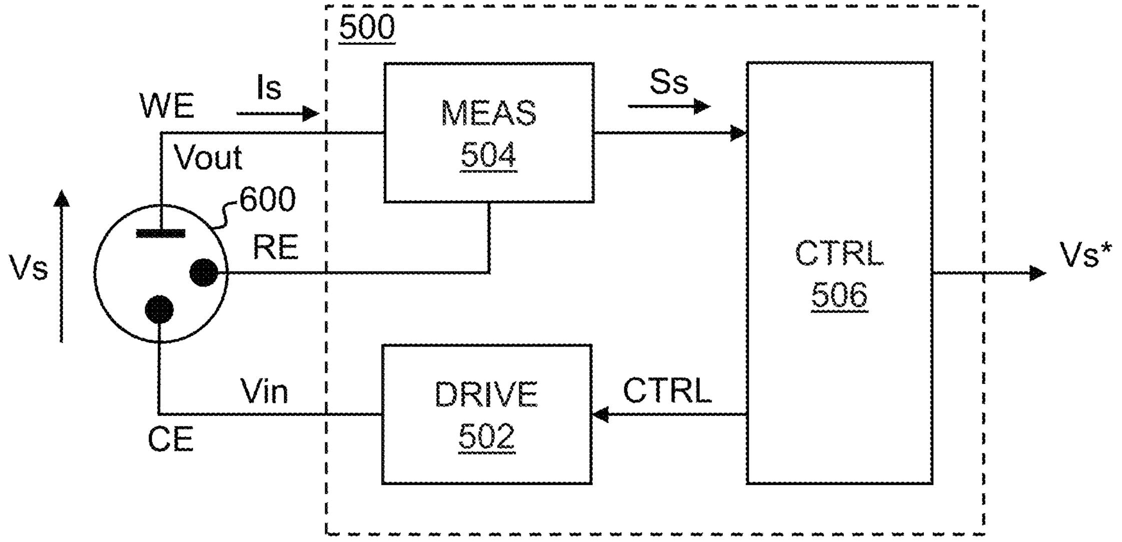

FIG. 6 is a schematic diagram of the drive and measurement circuitry 500 of FIG. 5 modified for operation with a three-electrode cell 600 which is a variation of the cell 300. The three-electrode cell 600 comprises a working electrode WE, a reference electrode RE, and a counter electrode CE. The counter electrode CE is coupled to the drive circuitry and the reference electrode is coupled to a second input to the measurement circuitry 504. The circuitry 500 operates in a similar manner in both arrangements shown in FIGS. 5 and 6 and so in the following, operation of the circuitry 500 will be described with reference to FIG. 5, i.e. characterisation of the two-electrode cell 300. In the three-electrode configuration, however, the current flows between the counter and working electrodes CE, WE, the reference electrode RE being provided as a reference node.

The circuitry 500 may be configured to operate in one or more control modes.

In a first mode, the control circuitry 506 may be configured to control the input voltage Vin to maintain the sense current Is at or near zero amps (or alternatively at or near a predetermined current level). By establishing the input voltage Vin at a level that causes no current to flow in the cell 300, electrode migration due to current leakage can be minimized or substantially avoided. Furthermore, due to the closed loop nature of the sensing path, the impedance at the analog front end (i.e. at the input of the measurement circuitry 504) and at the output (i.e. output of the control circuitry 506) is relatively low when compared to conventional potentiometric measurement techniques.

Thus, the first mode is useful in reducing noise associated with high impedance measurement techniques employed by conventional means.

In a second (diagnostic) mode, the control circuitry 506 may be configured to control the input voltage Vin to vary the sense voltage Vs across the cell 300 as part of an operation to determine a state of the sensor. For example, the control circuitry 506 may control the input voltage Vin to implement electrochemical impedance spectroscopy (EIS), chronoamperometry, or the like. A state of the sensor may comprise the health of the reference electrode RE, the working electrode WE or both. A state of the sensor may indicate a concentration of a chemical of interest.

As noted above, the measurement circuitry 504 is configured to output a sense Signal Ss which is proportional to the sense current Is at the working electrode WE. To do so, the measurement circuitry 504 may comprise a converter having a first input X, a second input Y and an output Z. A characteristic of the converter is its ability to establish on its first input X a voltage equal to the voltage provided to its second input Y. An example component which exhibits this characteristic includes a current conveyor (CC). A current conveyor (CC) is able to buffer an input current to its output Z whilst maintaining a voltage at its first input X equal to a voltage applied to its second input Y. Another example of a circuit element which exhibits such a characteristic is a transimpedance amplifier (TIA). When the measurement circuitry 502 is implemented as a TIA, a voltage at its output Z may be representative of an input current at its first input X.

Figure 7:
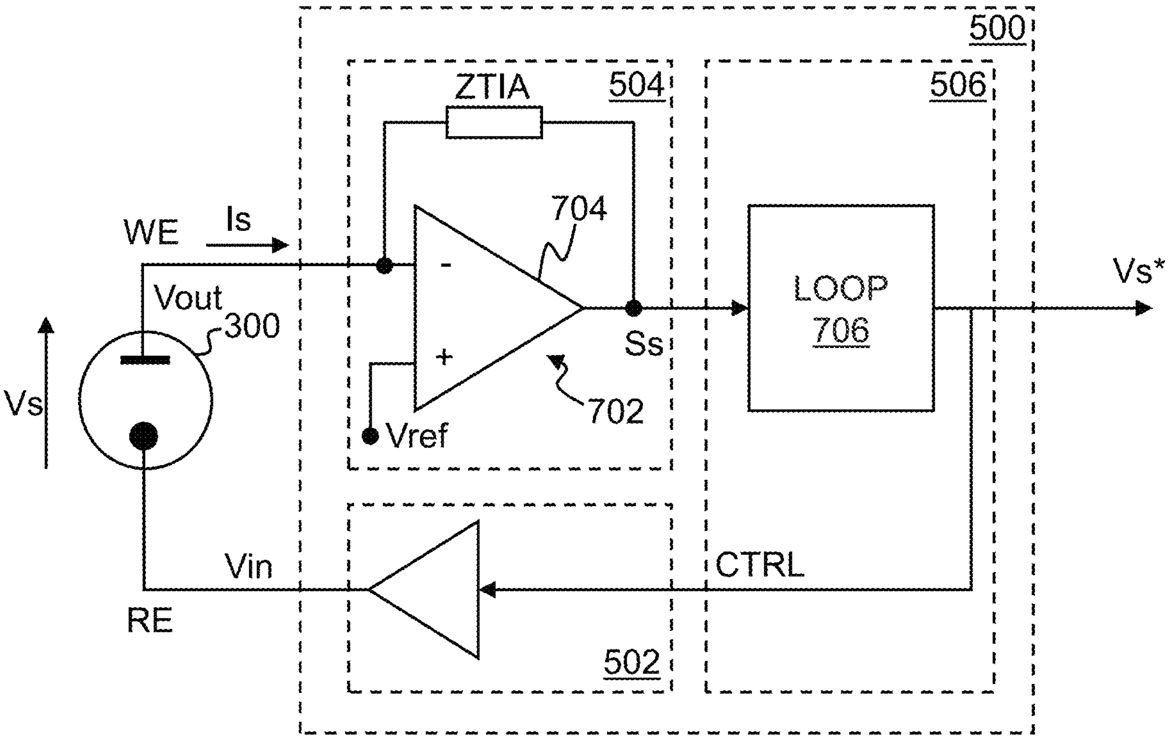

FIG. 7 is a schematic diagram of an example TIA implementation of the circuitry 500. The measurement circuitry comprises a TIA 702 comprising an operational amplifier (op-amp) 704 with a feedback impedance ZTIA coupled between an inverting input and output of the op-amp 704. A non-inverting input of the op-amp 704 is coupled to a reference voltage Vref. In some embodiments, the reference voltage Vref is set to half a supply voltage Vdd, i.e. Vref=Vdd/2, which allows for easier design of the TIA 702. The inverting input of the op-amp 704 is coupled to the working electrode WE. Thus, the TIA 702 is configured to output a voltage as the sense signal Ss which is proportional to the sense current Is.

In the embodiments shown in FIG. 7, the inverting input of the op-amp 704 is coupled to the working electrode WE and the non-inverting input of the op-amp 704 is coupled to the reference voltage Vref. In a variation of this arrangement, the non-inverting input of the op-amp 704 may be coupled to the working electrode and the inverting input of the op-amp 704 may be coupled to the reference voltage Vref.

The output of the op-amp 704 is coupled to the control circuitry 506, such that the sense signal Ss (in this case a current) is provided to a loop filter 706 of the control circuitry 506. The loop filter 706 is configured to filter the sense signal Ss to generate the output signal Vs* which is fed back to the drive circuitry 502 as the control signal CTRL. The output signal Vs* corresponds to the potential difference across the cell 300 needed to hold the sense current Is at a desired level (e.g. zero).

The drive circuitry 502 comprises a gain stage 708 which outputs the input voltage Vin to the reference electrode RE. The voltage Vin is proportional to the control signal CTRL, which is the output signal Vs* in this arrangement. Modulation of the voltage Vin at the reference electrode changes the sense voltage Vs across the cell 300.

In a variation of the circuitry 500 shown in FIG. 7, the TIA 702 may be replaced with a current conveyor. In which case, the sense signal Ss output from the current conveyor is a current.

As noted above, in the first mode, the circuitry 500 may be configured to control the sense voltage Vs (by controlling the input voltage Vin) to maintain the sense current Is at or near zero amps (or alternatively at or near a predetermined current level). The following example calculations are shown for different values of the sense voltage Vs in this first mode, where the supply voltage Vdd of the circuitry 500 is 1.8 V and the reference voltage Vref provided to the inverting input of the op-amp 704 is 0.9 V (i.e. Vdd/2).

For a sense voltage Vs of −0.4V:

$$Vs = -0.4\ \text{V}$$

$$Vin = Vout - Vs$$

$$Vin = 0.9 + 0.4 = 1.3\ \text{V}$$

And for a sense voltage of 0.2V:

$$Vs = 0.2\ \text{V}$$

$$Vin = Vout - Vs$$

$$Vin = 0.9 - 0.2 = 0.7\ \text{V}$$

Thus, it can be seen that changes in the sense voltage lead to changes in the input voltage Vin provided to the reference voltage RE, to maintain the sense current Is at or near zero amps.

In the second, (diagnostic) mode, the control circuitry 506 may be configured to control the input voltage Vin to vary the voltage Vs across the cell 300 as part of an operation to determine a state of the sensor. Example techniques for characterising a cell 300 by varying the sense voltage Vs across the cell 300 include EIS, chronoamperometry, and cyclic voltammetry.

Using any of these alternating current (AC) techniques, a determination can be made as to an optimum frequency at which to measure sensor impedance to maximise the sensor response to the desired ion (e.g. K) whilst minimising the response to an interfering ion (e.g. Na).

Taking cyclic voltammetry as an example, the circuitry 500 may be configured to perform cyclic voltammetry by controlling the drive circuitry 502 to sweep the input voltage Vin over a predetermined voltage range. When the monitored sense current Is drops to zero with the correct polarity on the reference electrode, the sense voltage Vs and the input voltage Vin will be of equal magnitude and opposite polarity. This technique can be used to determine an optimum point in time to sample the output voltage Vout to determine a state of the cell 300.

Figure 8:
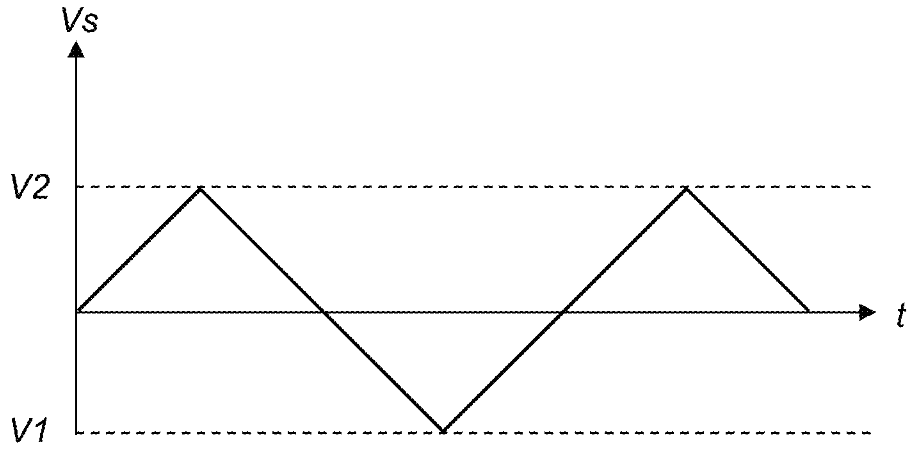
FIG. 8 is a graphical illustration of an example cyclic voltammetry signal.

FIG. 8 illustrates the sense voltage Vs across the cell 300 over time during cyclic voltammetry in which the sense voltage Vs is swept between two voltage V1, V2.

Figure 9:
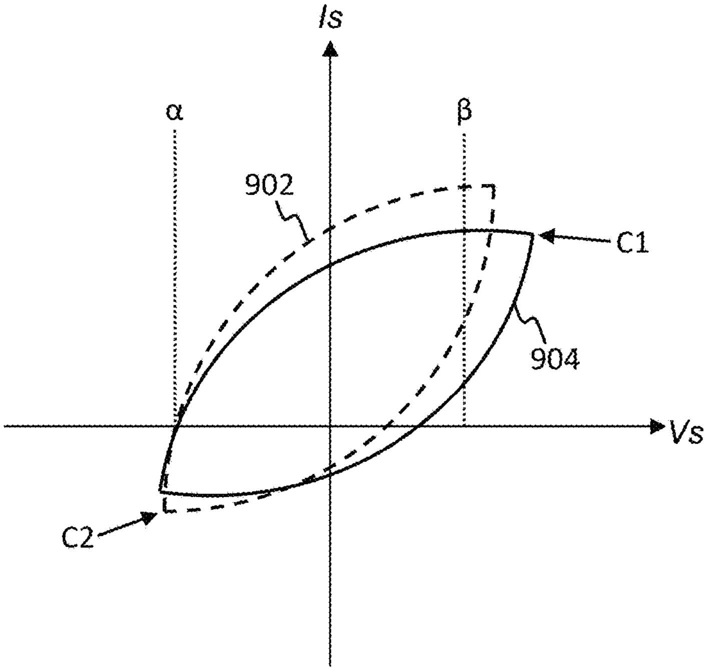
FIG. 9 is a voltammogram for measured sense signals responsive to the cyclic voltammetry signal of FIG. 8.

FIG. 9 illustrates first and second voltammograms 902, 904 for two different impedances of the cell 300 obtained using cyclic voltammetry, i.e. by varying the sense voltage Vs as shown in FIG. 8.

In the plot shown in FIG. 9, two points of interest include alpha and beta. Alpha corresponds to the voltage at which current is zero and the input voltage Vin has the correct polarity for the chemical reaction of interest. Beta is the voltage at which the first and second voltammograms 902, 904 are furthest apart, and therefore most discriminative.

Either of the alpha and beta points may be used to estimate a concentration of the cell 300. In doing so, the accuracy of such measurements may be improved by increasing signal-to-noise ratio (SNR).

To use the alpha (zero current) point, cyclic voltammetry may be performed and the point of zero current noted. Alternatively, a feedback loop, such as that of the circuitry 500, may be used to keep the current at zero.

To use the beta point (i.e. point of maximum discrimination), the feedback loop implemented by the circuitry 500 may apply a fixed voltage over the cell 300.

Figure 10:
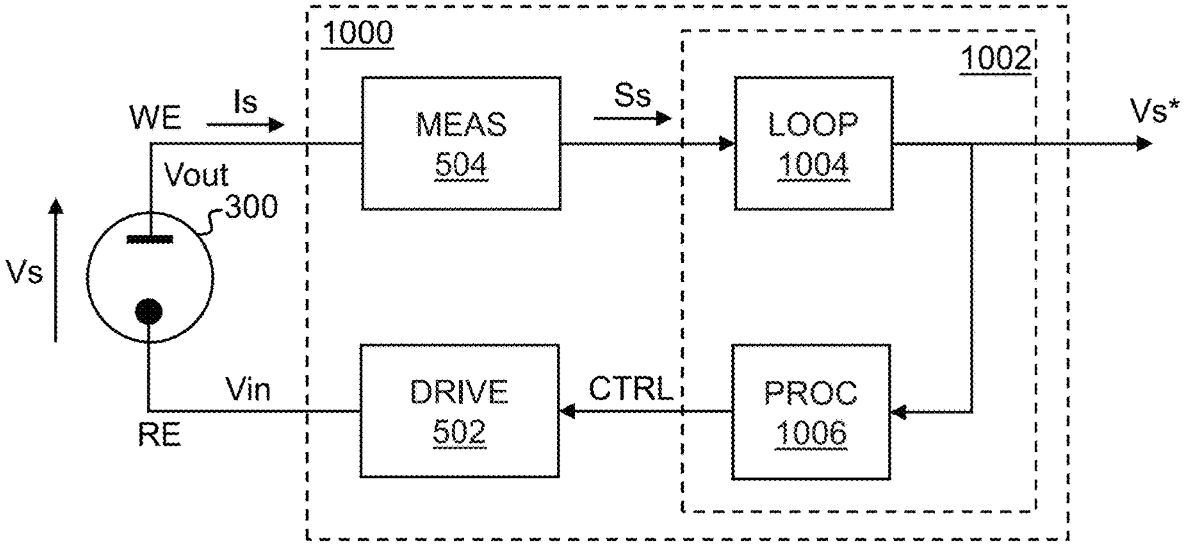
FIGS. 10 to 14 are schematic diagrams of drive and measurement circuits.

Taking into account the above, FIG. 10 is a schematic diagram of drive and measurement circuitry 1000 which is a variation of the circuitry 500 of FIG. 5, like parts being given like numbering. The circuitry 1000 differs from the circuitry 500 of FIG. 5 in that the control circuitry 506 is replaced with control circuitry 1002. The control circuitry 1002 comprises a loop filter 1004 and a processor 1006. The loop filter 1004 is configured to filter the sense signal Ss and output an output voltage Vs* which corresponds to the voltage Vs across the cell 300 needed to hold the sense current Is at the desired level.

When the output voltage Vs* deviates by more than a predetermined amount in a set period of time, or after a certain time has passed since the preceding measurement, the processor 1006 may be configured to output a control signal CTRL to control the drive circuitry 502 to output an AC stimulus Sstim which is applied to the cell 300. The response to that stimulus Stim is processed by the measurement circuitry 504, the control circuitry 1002, and optional downstream processing circuitry to determine or infer the concentration of a desired ion.

The stimulus may be in the form of a sine wave, a step function, a chirp or any other suitable AC stimulus.

The operation of applying the stimulus Sstim to the cell 300 is referred to herein as a system identification operation. A system ID operation may be implemented to identify characteristics of the sensor, for example by selection of a suitable stimulus Sstim to be applied.

It will be appreciated that, for the second (variable current or AC-sensing) mode, it is preferable that the measurement circuitry 504 is calibrated to provide an absolute reference for AC sensing. For example, if the measurement circuitry comprises the TIA 702 as illustrated in FIG. 7, the impedance ZTIA is preferably calibrated to provide the absolute reference.

Any of the circuitry 500, 1000 described above as well as that described below may be controlled to operate in one or more modes for different sensing scenarios:

1. A continuous DC-sensing or static current mode in which sensing of the sense current Is is performed continuously to maintain the sense current Is substantially stable (at zero amps or at a predetermined set current).
2. A continuous AC-sensing or variable current mode in which sensing is performed continuously by applying a variable stimulation signal Sstim to the reference electrode RE leading to a variable sense current Is.
3. A first hybrid mode in which continuous DC-sensing is performed, and such continuous DC sensing is interspersed with periods of AC-sensing at defined intervals.
4. A second hybrid mode in which continuous AC-sensing is performed, and such continuous AC sensing is interspersed with periods of DC-sensing at defined intervals.

It will be appreciated that the AC-sensing mode is likely to be of higher power. As such, in the first hybrid mode, the transition from a lower-power DC-sensing mode to a higher power AC sensing mode may be triggered by detection of relatively high or low levels of analytes. Such conditions may be indicative of a potentially abnormal condition requiring more detailed analysis or monitoring.

It will be understood that the periodic sensing operations may be performed at defined time intervals, based on the output of corresponding continuous sensing operations, and/or based on an interrupt command received from an external controller.

In systems where both DC- and AC-sensing is performed, it will be understood that the output of both the DC- and AC-sensing operations may be combined or fused together, e.g. using weighted or scored fusion, to provide a combined measurement output.

In the embodiment of the circuitry 500, 1000 shown in FIGS. 7 and 10, the circuitry 500 is provided as an analog circuit, the loop filter 706 of the control circuitry 506 implemented in the analog domain. In other embodiments, however, any part of the circuitry 500, 1000 may be implemented in the digital domain. For example, the loop filter 706 may be implemented in the digital domain.

Figure 11:
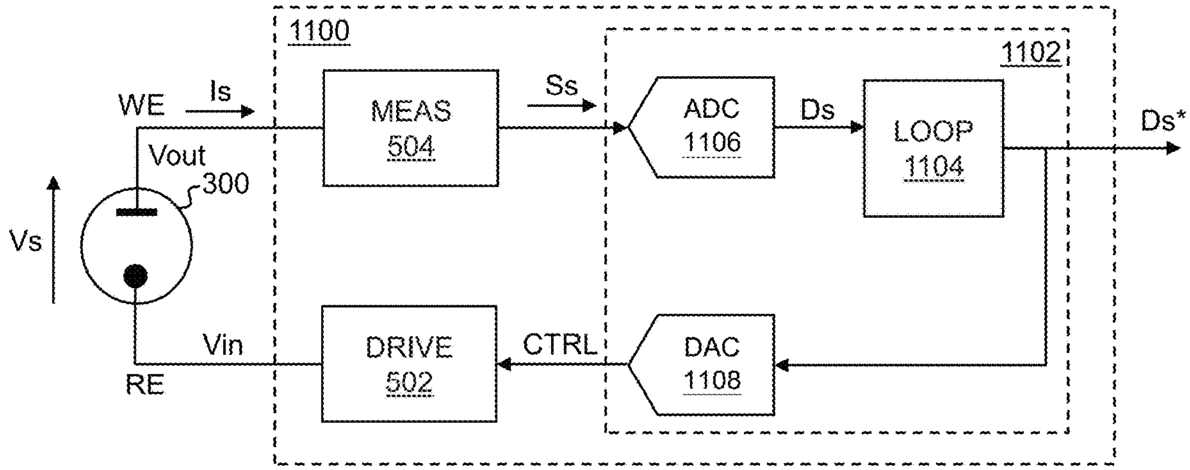

FIG. 11 is a schematic diagram of drive and measurement circuitry 1100 which is a variation of the circuitry 500 of FIG. 5, like parts being given like numbering. The circuitry 1100 differs from the circuitry 500 of FIG. 5 in that the control circuitry 506 is replaced with control circuitry 1102. The control circuitry 1102 comprises a digital loop filter 1104, an ADC 1106 and a DAC 1108. The sense signal Ss output from the measurement circuitry 504 is provided to an input of the ADC 1106 which is configured to output a digital sense signal DS to a digital loop filter 1104 of the control circuitry 1102. The digital sense signal DS represents the sense current Is at the working electrode WE. The digital loop filter 1104 is configured to filter the digital sense signal DS and output a digital output signal Ds* which may be provided to a further controller or processor (not shown) for downstream processing. The digital output signal Ds* is provided to an input of the DAC 1108 which outputs an analog signal representing the digital output signal Ds* as the control signal CTRL. This control signal is provided to the drive circuitry 502.

Figure 12:
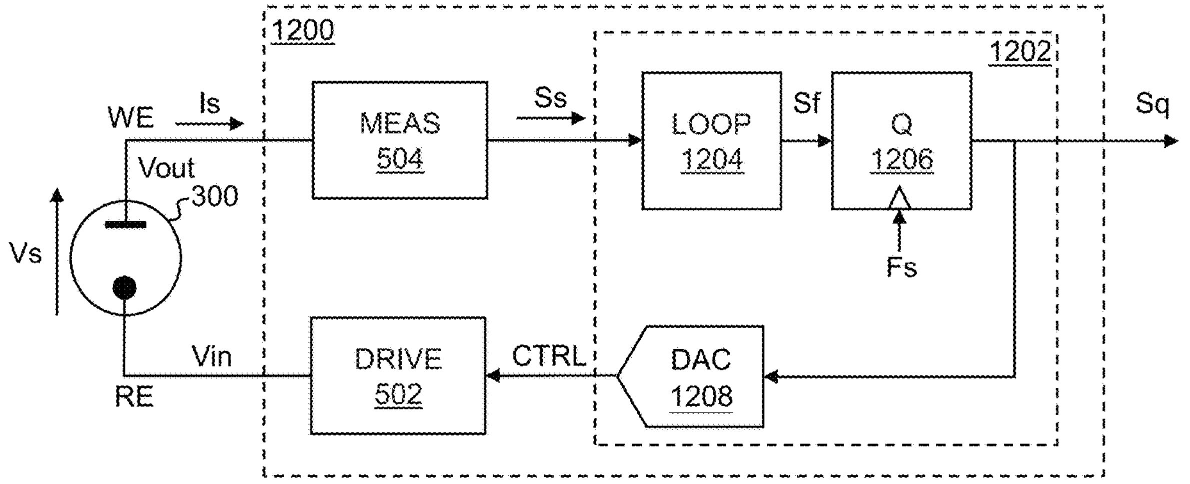

FIG. 12 is a schematic diagram of drive and measurement circuitry 1200 which is another variation of the circuitry 500 of FIG. 5, like parts being given like numbering. The circuitry 1200 differs from the circuitry 500 of FIG. 5 in that the control circuitry 506 is replaced with control circuitry 1202. The control circuitry 1202 comprises a loop filter 1204, a quantizer 1206 and a DAC 1208.

The loop filter 1204 is configured to filter the sense signal Ss from the measurement circuitry 504 and output a filtered sense signal Sf which is provided to the quantizer 1206.

The quantizer 1206 is clocked at a sampling frequency Fs and configured to sample the filtered sense signal Sf at the sampling frequency Fs to generate a (digital) sampled sense signal Sq. This signal Sq may be output to a processor (not shown) for further processing. The sampled sense signal Sq is provided to the DAC 1208 which converts the sampled sense signal Sq to the control signal CTRL provided to the drive circuitry 502 for controlling the input voltage Vin.

Thus, the loop filter 1204 in this arrangement is implemented as part of a sigma-delta ADC, the output of the loop filter 1204 being sampled by the quantizer 1206 which is passed back to the drive circuitry 502 via the DAC 1208.

Like the circuitry 500, 1000 of FIGS. 5, 6, 7 and 10, the circuitry 1100, 1200 may be operated in both DC- and AC-sensing modes.

Either of the loop filter 1104, 1204 may be implemented using any conceivable architecture. For example, each of the filters may implement one of a discrete Fourier transform (DFT), a fast Fourier transform (FFT), or an autocorrelation, infinite impulse response (IIR) calculation, and/or a Goertzel algorithm.

In AC-sensing modes it will be appreciated that an AC stimulus Sstim applied by the drive circuitry 502 may be at a relatively low frequency (e.g. in the order of millihertz (mHz)). In such situations, a large buffer size would be required to transform respective sense signals Ss or outputs Vs* using a Fourier transform (e.g. FFT or DFT). An alternative approach which enable real-time conversion to the frequency domain is to use a Goertzel filter (or algorithm).

In any of the circuitry 500, 1000, 1100, 1200 described above, it is advantageous to consider start up conditions to avoid pushing error charge onto the electrochemical cell or sensor.

Referring to the circuitry 500 of FIG. 7 as an example, during startup, the control loop (comprising the measurement circuitry 502, the control circuitry 506 and the drive circuitry 502) may take time to settle, during which time charge can be pushed onto capacitances of the cell 300, causing the loop to become high impedance. This, in turn, means that charge takes time to flow through these high impedances, causing settling at startup to take a significant amount of time.

There are two phases during startup when error charge can be forced onto the cell 300, charging capacitances of the cell 300.

In a first startup phase, directly after startup, the sense signal Ss is low which causes the voltage Vs to increase. This in turn causes current to flow through the cell 300 which charges capacitances of the cell 300.

In a second startup phase, once the sense signal Ss is at equilibrium, the control loop (comprising the measurement circuitry 502, the control circuitry 506 and the drive circuitry 502) is not yet stabilised. As such, current flows into or out of the cell 300 to correct for instabilities in the control loop.

Once settled, the control loop is configured to resist current flow into or out of the cell 300. Thus, from the perspective of the cell 300, the measurement circuit 504 has a high input impedance. Thus, any charge present on the cell 300 due to the first and second startup phases becomes trapped due to the control loops resistance to current flow to and from the cell 300. This trapped charge can only discharge through parallel impedances. Typical trapped capacitance may be in the order of nano-farads (nFs) and the parallel impedance in the order of gigaohms (GOhms). Thus, the associated time constant can be in the order of hours.

Embodiments of the present disclosure may implement one or more techniques to reduce the effect of charge trapping on the cell 300. Such techniques include but are not limited to pre-charging of the loop and reducing the impedance of the loop at startup to allow any charge to be removed more quickly.

The loop may be pre-charged at two or more locations. For example, the input of the measurement circuit 504 may be connected to a reference voltage (e.g. Vref) before initiating the loop. In addition, the loop filter 706 may be preloaded with an expected value of the sense voltage Vs. Such preloading may be performed by measuring the sense voltage Vs of the cell using a traditional high input impedance potentiometric measurement (as described above).

For example, the circuitry 500 may initially startup in a potentiometric measurement mode in which the circuitry 500 is configured to operate in an open loop mode. In this potentiometric mode, the sense voltage Vs measured during a settling period (for example until the gradient of the sense voltage Vs is below a threshold). Once the sense voltage Vs has reached a certain stability, the measurement circuitry

500 may be configured to switch to a potentiometric measurement mode in which the circuitry 500 is configured to operate in a closed loop mode. In this mode, a voltage bias Vin is applied to the cell 300 by the drive circuitry 502. The control loop may the adjust the input voltage Vin applied to the cell according to the measured sense signal Ss to minimize the sense current Is at the working electrode WE. The control loop may be initiated with safeguards in place to limit any step in input voltage Vin, which may cause current to flow through the cell 300.

The loop impedance of the control loop comprising drive, measurement and control circuitry 502, 503, 506 is determined by the loop gain. Where the loop comprises an integrator, the loop impedance may be very high. The gain of the integrator, and therefore the loop impedance can be reduced by making the integrator leaky. In analogue, this would mean putting a resistor in parallel with the integrating capacitor. In digital (such as a software or firmware implementation) the output of the integrator may be set to the sum of the input and a portion of the previous integrator value.

Any or all of the circuitry 500, 1000, 1100, 1200 described above may be implemented as part of a single integrated circuit (IC) or split across multiple separate ICs.

Figure 13:
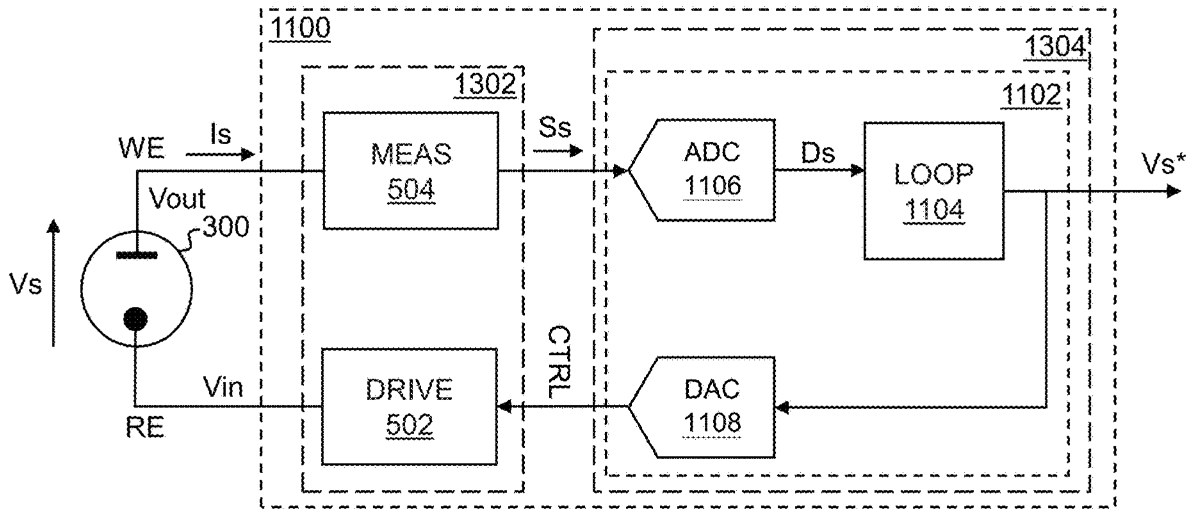

FIG. 13 provides one such example which shows an example distribution of the circuitry 1100 of FIG. 10 over first and second ICs 1302, 1304. The measurement circuitry 504 and drive circuitry 502 are provided on the first IC 1302. The loop filter 1004, ADC 1106 and DAC 1108 are provided on the second IC 1304.

In such an arrangement, first IC 1302 comprising the analog front end (comprising measurement and drive circuitry 504, 502) is coupled with the second IC 1304 to allow the loop filter 1104 to be implemented as a digital processing module. The second IC 1304 may be a standalone controller for the circuitry 1100, an FPGA, or may be combined with other system ICs (e.g. a system-level controller or communications module). Such a split approach may allow for the first and second ICs 1302, 1304 to be manufactured separately using different process technologies, thereby allowing for appropriate underlying technologies to be used resulting in cost and efficiency optimization.

In a variation of the arrangement shown in FIG. 13, the drive and measurement circuitry 502, 504 may be integrated with the ADC 1106 and DAC 1108, such that the ADC 1106 and DAC 1108 are provided on the first IC 1302 and only the loop filter is provided on the second IC 1304.

In a further variation of the arrangement shown in FIG. 13, the measurement circuitry 504 and the drive circuitry 502 may be implemented using discrete components, e.g. separate ICs for each of the measurement and drive circuitry 504, 502.

Embodiments are described above with reference to cells 100, 200, 300 comprising two electrodes (e.g. a working electrode WE and a counter electrode CE, or a reference electrode RE and a working electrode WE). Embodiments of the disclosure are not, however, limited to having cells having only one counter electrode or only one working electrode. The concepts described herein are particularly applicable to cells comprising multiple working electrodes or multiple counter electrodes. In doing so, such sensors may either providing redundancy or enabling the sensing of multiple analytes in a single chip. This may be particularly advantageous in applications such as continuous glucose monitoring, where it may be desirable to measure concentrations of several analytes including but not limited to two or more of glucose, ketones, oxygen, lactate, and the like. Moreover, the measurement circuits described herein may be configurable in different configurations for different types of measurements. Such measurements may be of the same or different cells or electrodes.

Figure 14:
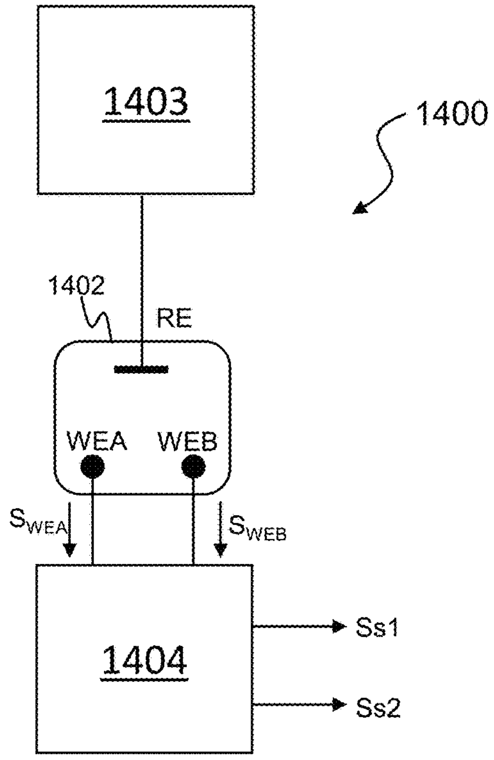

FIG. 14 illustrates an example circuit 1400. In the circuit 1400, an electrochemical cell 1402 is shown comprising first and second working electrode WEA, WEB and a reference electrode RE. Each of the first and second working electrodes WEA, WEB may comprise an ISE. A drive circuit 1403 is provided to apply a stimulus or DC bias to the reference electrode RE. A measurement circuit 1404 is provided which is configured to output a first sense signal Ss1 based on a signal $S_{WEA}$ derived from the first working electrode WEA and output a second sense signal Ss2 based on a signal $S_{WEB}$ derived from the second working electrode WEB. The measurement circuit 1404 may, for example, comprise two processing channels, each processing channel implementing the circuitry described with reference to any of FIG. 5, 6, 7, 10, 11, or 12. Alternatively, various components of the circuitry described with reference to FIG. 5, 6, 7, 10, 11, or 12 may be shared between the two processing channels, e.g., through multiplexing or similar known techniques.

Embodiments of the present disclosure are described with reference to example electrochemical cells 100, 200, 300. It will be appreciated, however, that the techniques and apparatus described herein may be used in conjunction with any conceivable electrochemical system, including but not limited to electrochemical cells comprising at least two electrodes (e.g. two or more of a counter electrode CE, a working electrode WE and a reference electrode RE), or electrochemical cells with more than three electrodes (e.g. two or more counter electrodes and/or two or more working electrodes). Electrodes of the electrochemical cells described herein may also be referred to as anodes and/or cathodes as is conventional in the field of electrical batteries.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus, the code may comprise conventional program code or microcode or, for example code for setting up or controlling an ASIC or FPGA. The code may also comprise code for dynamically configuring re-configurable apparatus such as re-programmable logic gate arrays. Similarly, the code may comprise code for a hardware description language such as Verilog TM or VHDL (Very high-speed integrated circuit Hardware Description Language). As the skilled person will appreciate, the code may be distributed between a plurality of coupled components in communication with one another. Where appropriate, the embodiments may also be implemented using code running on a field-(re) programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general-purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. Circuitry for processing a sense signal obtained from an electrochemical cell having a first electrode and a second electrode, the circuitry comprising:

drive circuitry configured to apply a first voltage at a first electrode;

measurement circuitry configured to measure a sense current at the second electrode and output a sense signal based on the measured sense current;

control circuitry configured to:

generate an output signal based on the sense signal; and adapt the first voltage based on the output signal;

wherein the control circuitry is configured to switch between a DC-sensing mode and an AC sensing mode, wherein:

in the DC-sensing mode, the control circuitry is configured to control the first voltage to maintain the sense current at or near a predetermined current level; and in the AC-sensing mode, the control circuitry is configured to adapt the first electrode voltage to have a time varying component.

2. Circuitry of claim 1, wherein the sense signal comprises a sense voltage or a sense current.

3. Circuitry of claim 1, wherein the control circuitry is configured in a DC-sensing mode to control the first voltage to maintain the sense current at or near a predetermined current level.

4. Circuitry of claim 1, wherein the control circuitry is configured in an AC-sensing mode to control the drive circuitry to adapt the first voltage to have a time-varying component.

5. Circuitry of claim 4, wherein the control circuitry is configured to control the first voltage to comprise a sine wave, a step function, or a chirp.

6. Circuitry of claim 4, wherein the control circuitry is configured to:

determine a second voltage at which the sense signal is substantially zero; and determine a characteristic of the electrochemical cell based on the second voltage.

7. Circuitry of claim 4, wherein the control circuitry is configured to:

determine a third voltage at which the sense signal is most discriminative.

8. Circuitry of claim 7, wherein the control circuitry is configured to switch between the DC-sensing mode and AC sensing mode in response to an interrupt or determining that an analyte concentration in the cell is outside of a predetermined range.

9. Circuitry of claim 7, wherein the control circuitry is configured to combine measurements obtained in the DC-sensing mode and the AC-sensing mode.

10. Circuitry of claim 1, wherein the measurement circuitry comprises a transimpedance amplifier, TIA, comprising:

an op-amp having a first input coupled to the second electrode, a second input coupled to a reference voltage node, a TIA output to output the sense signal; and a feedback impedance coupled between the TIA output and the first input.

11. Circuitry of claim 1, wherein the measurement circuitry comprises a current conveyor, CC, comprising:

a first input coupled to the second electrode, a second input coupled to a reference voltage node, and a current conveyor output to output the sense signal.

12. Circuitry of claim 1, wherein the control circuitry comprises a loop filter configured to filter the sense signal to generate the output signal, the output signal provided as an input to the drive circuitry.

13. Circuitry of claim 1, wherein the control circuitry comprises:

an analog-to-digital converter, ADC, configured to convert the sense signal to a digital sense signal;

a digital loop filter configured to filter the digital sense signal to obtain the output signal; and a digital-analog converter, DAC, configured to convert the output signal to a control signal for controlling the drive circuitry.

14. Circuitry of claim 1, wherein the control circuitry comprises:

a quantiser configured to sample the output signal at a sampling frequency to generate a sampled output signal; and a DAC configured to convert the sampled output signal to a control signal for controlling the drive circuitry.

15. Circuitry of claim 1, wherein the measurement circuitry is configured to output the sense signal based on the output signal, wherein the measurement circuitry comprises a gain stage, and wherein the output signal is provided as an input to the gain stage, the gain stage configured to output the drive voltage.

16. Circuitry of claim 1, wherein the second electrode is an ion-selective electrode.

17. Circuitry of claim 1, further comprising processing circuitry configured to:

determine an impedance of the electrochemical cell and/or a concentration of an analyte in the electrochemical cell based on the output signal.

18. Circuitry of claim 1, wherein the circuitry is operable in a potentiostatic mode and a potentiometric mode, wherein:

in the potentiostatic mode, the circuitry is operable in an open loop configuration in which the adaptation of the first voltage based on the output signal is disabled; and in the potentiometric mode, the circuitry is operable in a closed loop configuration in which the adaptation of the first voltage based on the output signal is enabled.

19. Circuitry for use in a system for processing a signal obtained from an electrochemical cell having a first electrode and a second electrode, the control circuitry configured to:

receive a sense signal from measurement circuitry configured to measure a sense current at the second electrode and output the sense signal based on the measured sense current;

generate an output signal based on the sense signal; and control drive circuitry to apply a first voltage at the first electrode, wherein the control circuitry is configured to adapt the input voltage based on the output signal;

wherein the control circuitry is configured to switch between a DC-sensing mode and an AC sensing mode, wherein:

in the DC-sensing mode, the control circuitry is configured to control the first voltage to maintain the sense current at or near a predetermined current level; and in the AC-sensing mode, the control circuitry is configured to control the first circuitry to adapt the first electrode voltage to have a time varying component.

20. Circuitry for characterizing an electrochemical cell having a first electrode and a second electrode, the circuitry configured to operate in:

a closed loop mode for potentiometric measurement of the electrochemical cell, the closed loop mode comprising measuring a sense voltage across the cell; and an open loop mode for potentiostatic measurement of the electrochemical cell, the open loop mode comprising applying a first voltage to the first electrode and measuring a response of the electrochemical cell at the second electrode, the first voltage dependent on the measured response.

21. A system, comprising:

a first integrated circuit, IC, comprising the drive circuitry and the measurement circuitry of claim 1; and a second IC comprising the control circuitry of claim 1.

22. An electrochemical sensor, comprising:

the circuitry of claim 1; and the electrochemical cell.

23. The electrochemical sensor of claim 22, wherein the first electrode is a reference electrode, the second electrode is a first ion selective electrode, and wherein the electrochemical cell further comprises a second ion selective electrode.

24. An electronic device, comprising the circuitry of claim 1, wherein the electronic device comprises one of an analyte monitoring device or an analyte sensing device, a battery, a battery monitoring device, a mobile computing device, a laptop computer, a tablet computer, a games console, a remote control device, a home automation controller or a domestic appliance, a toy, a robot, an audio player, a video player, or a mobile telephone, and a smartphone.

25. A method of controlling a system comprising drive circuitry and measurement circuitry, the system for processing a signal obtained from an electrochemical cell having a first electrode and a second electrode, the method comprising:

receiving a sense signal from the measurement circuitry configured to measure a sense current at the second electrode and output the sense signal based on the measured sense current;

generating an output signal based on the sense signal; and controlling the drive circuitry to apply a first voltage at the first electrode; and adapting the input voltage based on the output signal;

the method further comprising switching between a DC-sensing mode and an AC sensing mode, wherein:

the DC-sensing mode comprises controlling the first voltage to maintain the sense current at or near a predetermined current level; and the AC-sensing mode comprises controlling the first circuitry to adapt the first electrode voltage to have a time varying component.

26. Circuitry for processing a sense signal obtained from an electrochemical cell having a first electrode and a second electrode, the circuitry comprising:

drive circuitry configured to apply a first voltage at a first electrode;

measurement circuitry configured to measure a sense current at the second electrode and output a sense signal based on the measured sense current;

control circuitry configured to:

generate an output signal based on the sense signal; and adapt the first voltage based on the output signal;

wherein the control circuitry comprises a loop filter configured to filter the sense signal to generate the output signal, the output signal provided as an input to the drive circuitry.

27. Circuitry for processing a sense signal obtained from an electrochemical cell having a first electrode and a second electrode, the circuitry comprising:

drive circuitry configured to apply a first voltage at a first electrode;

measurement circuitry configured to measure a sense current at the second electrode and output a sense signal based on the measured sense current;

control circuitry configured to:

generate an output signal based on the sense signal; and adapt the first voltage based on the output signal;

wherein the control circuitry comprises:

an analog-to-digital converter, ADC, configured to convert the sense signal to a digital sense signal;

a digital loop filter configured to filter the digital sense signal to obtain the output signal; and a digital-to-analog converter, DAC, configured to convert the output signal to a control signal for controlling the drive circuitry.

28. Circuitry for processing a sense signal obtained from an electrochemical cell having a first electrode and a second electrode, the circuitry comprising:

drive circuitry configured to apply a first voltage at a first electrode;

measurement circuitry configured to measure a sense current at the second electrode and output a sense signal based on the measured sense current;

control circuitry configured to:

generate an output signal based on the sense signal; and adapt the first voltage based on the output signal;

wherein the control circuitry comprises:

a quantiser configured to sample the output signal at a sampling frequency to generate a sampled output signal; and a DAC configured to convert the sampled output signal to a control signal for controlling the drive circuitry.

29. Circuitry for processing a sense signal obtained from an electrochemical cell having a first electrode and a second electrode, the circuitry comprising:

drive circuitry configured to apply a first voltage at a first electrode;

measurement circuitry configured to measure a sense current at the second electrode and output a sense signal based on the measured sense current;

control circuitry configured to:

generate an output signal based on the sense signal; and adapt the first voltage based on the output signal;

wherein the second electrode is an ion-selective electrode.

30. An electrochemical sensor, comprising:

an electrochemical cell having a reference electrode, a first ion selective electrode, and a second ion selective electrode; and circuitry for processing a sense signal obtained from the electrochemical cell, the circuitry comprising:

drive circuitry configured to apply a first voltage at the reference electrode;

measurement circuitry configured to measure a sense current at the first ion selective electrode and output a sense signal based on the measured sense current;

control circuitry configured to:

generate an output signal based on the sense signal; and adapt the first voltage based on the output signal.

* * * * *